(12) United States Patent
Claprood

(10) Patent No.: US 7,926,964 B2
(45) Date of Patent: Apr. 19, 2011

(54) DIAL CONTROL WITH LED LIGHT RING

(75) Inventor: Edward J. Claprood, Bellingham, MA (US)

(73) Assignee: Illinois Tool Works Inc., Glenview, IL (US)

( * ) Notice: Subject to any disclaimer, the term of this patent is extended or adjusted under 35 U.S.C. 154(b) by 413 days.

(21) Appl. No.: 12/133,731

(22) Filed: Jun. 5, 2008

(65) Prior Publication Data

US 2009/0080176 A1    Mar. 26, 2009

Related U.S. Application Data

(60) Provisional application No. 60/975,358, filed on Sep. 26, 2007.

(51) Int. Cl.
*F21V 23/04* (2006.01)
(52) U.S. Cl. ............. 362/26; 362/24; 362/27; 362/28; 362/30; 362/249.02
(58) Field of Classification Search .............. 362/26, 362/24, 27, 28, 30, 249.02; 315/326; 200/313, 200/316, 311, 317; 40/546
See application file for complete search history.

(56) References Cited

U.S. PATENT DOCUMENTS

| | | | | |
|---|---|---|---|---|
| 3,739,512 A | * | 6/1973 | Ruppert | 40/546 |
| 4,211,955 A | * | 7/1980 | Ray | 315/53 |
| 4,431,966 A | * | 2/1984 | Pucciarello | 324/114 |
| 4,571,531 A | * | 2/1986 | Lin | 320/134 |
| 6,663,249 B2 | * | 12/2003 | Pan | 362/23 |
| 2001/0015201 A1 | * | 8/2001 | Pollock et al. | 126/41 R |
| 2006/0164229 A1 | * | 7/2006 | Masters et al. | 340/461 |

FOREIGN PATENT DOCUMENTS

JP            08122102 A  *  5/1996

* cited by examiner

*Primary Examiner* — Sharon E Payne
(74) *Attorney, Agent, or Firm* — Mark W. Croll; Paul F. Donovan

(57) ABSTRACT

An illuminated control for a gas range or the like provides arcuate reflective chambers capped by diffusers to create a substantially continuous glowing circular sector indicating the status of a possibly low visibility gas flames. Line power may be used for direct drive of light emitting diodes illuminating the reflective chambers through the use of discrete series-connected voltage dropping resistors distributed to prevent heat concentration.

13 Claims, 3 Drawing Sheets

DIAL CONTROL WITH LED LIGHT RING

CROSS-REFERENCE TO RELATED APPLICATIONS

This application claims the benefit of U.S. provisional application 60/975,358 filed Sep. 26, 2007 hereby incorporated by reference.

STATEMENT REGARDING FEDERALLY SPONSORED RESEARCH OR DEVELOPMENT

--

BACKGROUND OF THE INVENTION

The present invention relates to controls for household appliances and in particular for control providing a visual indication of the setting of the control.

Dial controls, for example, those used on a cook top, provide an operator (such as a knob) for controlling the heat setting of the burners of the cook top. Most simply, the position of the knob provides a visual indication to the user of the particular setting selected by the user.

Sometimes it may be desirable to provide an electronic display indicating the state of a burner apart from the position of the dial control. For example, a light may be used to indicate that the burner is in simmer mode on a gas-stove top when this might not be apparent from the position of the control dial. More generally, the light may provide a high visibility indication that one or more burners have been left on.

Conventional incandescent lamps or gas discharge lamps (e.g. neon lamps) are often used in this application. Such lamps are rugged, can be powered directly with line voltage readily available in the appliance, and are resistant to the high temperatures associated with cook top use. Unfortunately the colors and shapes of such lamps are limited and thereby constrain the ability of the designer of an appliance to produce attractive and functional control consoles.

SUMMARY OF THE INVENTION

The present invention provides a dial control for an appliance or the like that provides illuminated arcuate segments positioned about the dial operator. Each segment is illuminated by a set of LEDs mounted in a reflective chamber having the desired arcuate shape and capped by a light diffuser. The chamber and diffuser permit uniform, colored illumination of a sector shape by LEDs powered directly from rectified line voltage dropped through a series of discrete resistors.

Specifically, the present invention provides an illuminated dial control having a dial operator rotating about an axis and switch circuitry communicating with the dial operator to produce switched electrical signals with rotation of the dial operator. Arcuate, internally reflective chambers are positioned concentrically about the axis and around the dial operator, and light diffusers are positioned on front surfaces of the reflective chambers so as to, together with the reflective chambers, define sectors of a ring about the axis. Light emitting diodes are positioned at a back surface of the reflective chambers and receive the switched electrical signals to evenly illuminate different sectors of the ring with rotation of the dial operator.

It is thus one object of at least one embodiment of the invention to provide arcuate illuminated indicators of arbitrary color that can demarcate ranges of a rotary operator.

The control may further include a gas valve operated by the dial operator to control a gas burner.

It is thus an object of at least one embodiment of the invention to provide a dial control suitable for use with gas ranges.

The switch circuitry may illuminate at least one sector at all times when the burner is on.

It is thus an object of at least one embodiment of the invention to provide a signal to the user that a flame may be present, particularly for low flame settings.

The burner control may further include a rotary encoder communicating with the operator.

It is thus an object of at least one embodiment of the invention to provide a control that may produce an electric signal indicating the position of the operator.

The chambers may have a height measured from a front surface to a back surface substantially no less than the width of the chamber measured along the radius of the arcuate chambers.

It is thus an object of at least one embodiment of the invention to provide for even illumination with a small number of LEDs by providing multiple internal reflections as light passes upward in the chambers.

The LEDs may be blue LEDs.

It is thus an object of at least one embodiment of the invention to provide a color that reminds users of the possibility of blue gas flames.

The invention may employ at least one rectifier receiving line voltage and a resistance element communicating with the rectifier to provide a reduced voltage that may be switched by the switch circuitry to provide the switched electrical signals to the light emitting diodes.

It is thus an object of at least one embodiment of the invention to provide an LED-based illumination system that may operate directly on line-voltage eliminating the need for complex power conditioning circuitry.

The invention may employ two rectifiers electrically in series and separated by a resistance of the resistive element.

It is thus an object of at least one embodiment of the invention to reduce the possibility of excess heat being generated in the resistive element upon a single rectifier failure.

The invention may provide a printed circuit board supporting the light diffusers and light emitting diodes on a first surface surrounding the axis and having a hole allowing an operator shaft to pass through the printed circuit board to communicate with a wiper interengaging with a contact set on a second surface of the printed circuit board opposite the first surface, the wiper and contact set forming a portion of the switch circuitry.

It is thus an object of at least one embodiment of the invention to provide for simplified manufacture of such a control employing a single printed circuit board.

The printed circuit board may further include at least one rectifier diode receiving a line voltage and the switch circuitry may further include at least one set of series connected discrete resistors communicating with the rectifier diode and providing a reduced voltage connectable directly to light emitting diodes by the switch circuitry.

It is thus an object of at least one embodiment of the invention to provide line voltage operation in a manner consistent with the thermal limits of a printed circuit board.

The series connected resistors and at least one diode may be arrayed on a second surface of the printed circuit board opposite the LEDs.

It is thus an object of at least one embodiment of the invention to provide a control having heat-dissipating components removed from a front panel.

The printed circuit board may further include a secondary contact set interengaging with the wiper to provide a signal independently indicating operator position.

It is thus an object of at least one embodiment of the invention to fully integrate various control aspects onto a single printed circuit board.

The light emitting diodes may be arranged along an arc of constant radius with their axes rotated corresponding to the position along the arc.

It is thus an object of at least one embodiment of the invention to provide for radial symmetry in illumination variations to make any variations less noticeable.

The light emitting diodes for each sector may be in series.

It is thus an object of at least one embodiment of the invention to reduce the necessary voltage drop across the resistive elements and thus the heat dissipation in any one location.

These particular objects and advantages may apply to only some embodiments falling within the claims and thus do not define the scope of the invention.

DETAILED DESCRIPTION OF THE INVENTION

Figure 1:
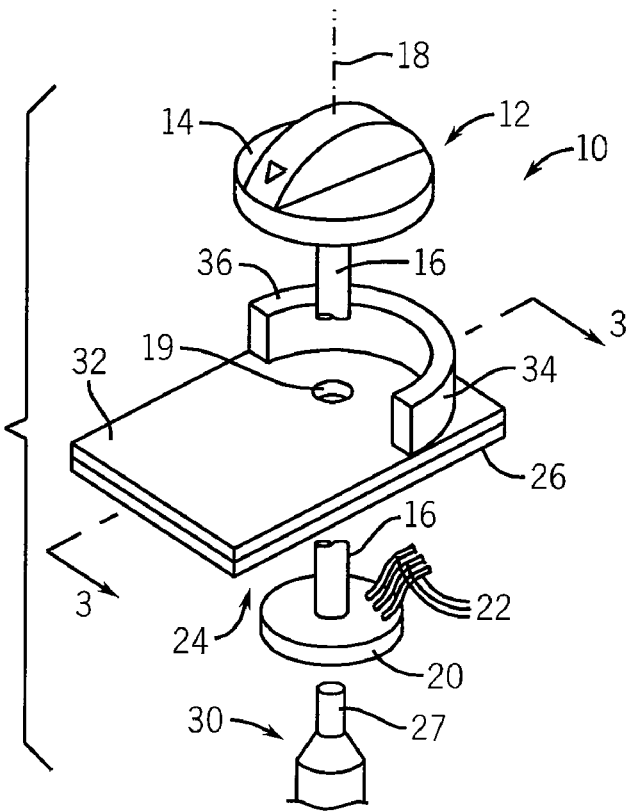
FIG. 1 is an exploded view of the dial control of the present invention having a rotating operator communicating with a wiper assembly engaging contacts on a printed circuit and attached to a gas valve, the dial control further providing arcuate reflective chambers surrounding the dial operator.

Referring now to FIG. 1, the dial control 10 of the present invention includes an operator 12, for example, a knob 14 having a shaft 16 extending along an axis 18. The shaft 16 may pass through a hole 19 in a molded lamp housing 32 and a printed circuit board 26 to attach to a wiper plate 20 holding a first set of electrical wipers 22. The wiper plate 20 rotates with the shaft 16 and electrical wipers 22 may connect with a set of electrical contacts 24 on the bottom of a printed circuit board 26 in the manner of a rotary switch. The lower end of shaft 16 may also connect with a shaft 27 of a gas valve 30 to provide control of a gas line (not shown) directed to a gas burner of a cook top.

Figure 2:
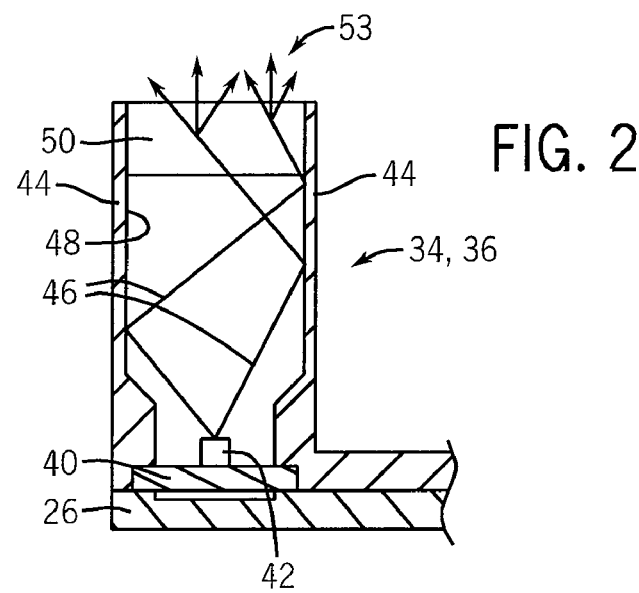
FIG. 2 is a cross section through a reflective chamber showing its operation shaping light from the LEDs into sector-shaped indicators.
Figure 3:
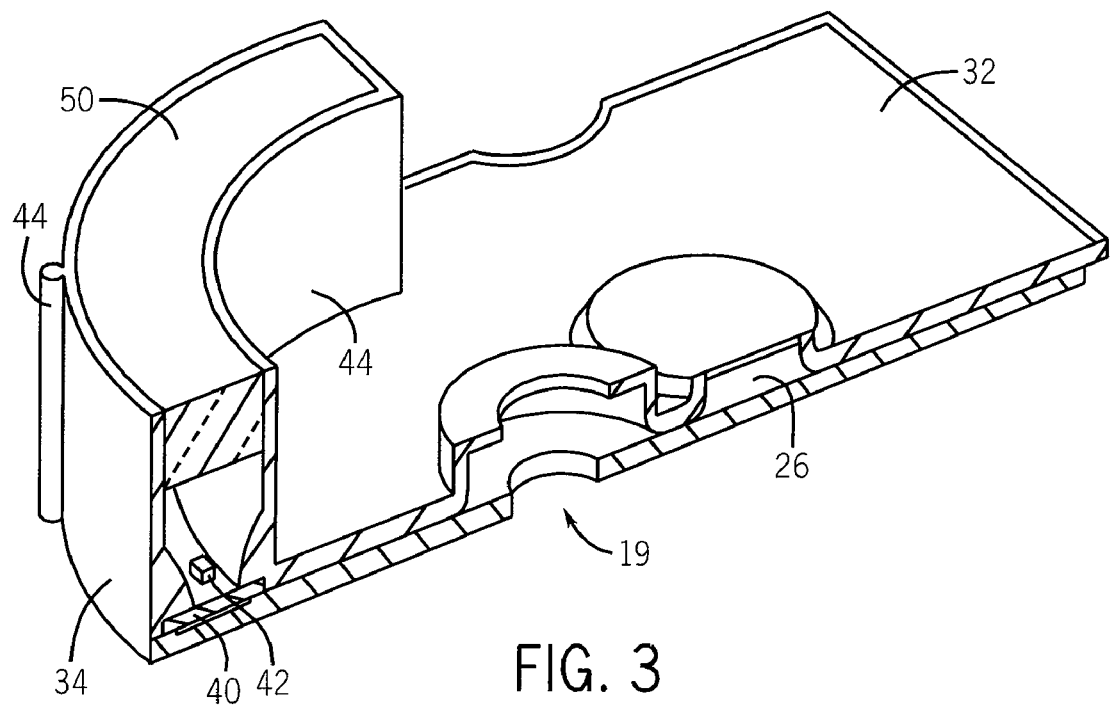
FIG. 3 is a cross-sectional view along lines 3-3 of FIG. 1 showing a molded reflective chamber assembly receiving an LED board carrier and sitting on top of a printed circuit board.

Referring now to FIGS. 2 and 3, the molded lamp housing 32 may fit against the top of the printed circuit board 26 and provides upwardly extending arcuate chambers 34 and 36 together defining an arc extending slightly over 180° about axis 18 to surround the periphery of the knob 14. Chamber 36 extends approximately 30° and chamber 34 extends approximately 120° of the arc.

The chambers 36 and 34 are open along their bottom to receive an arcuate LED carrier card 40 forming a bottom of the chambers 34 and 36 and holding on its upper surface blue LEDs 42. The LED carrier card 40 may be electrically connected to other circuitry on the printed circuit board 26 by electrical vias or pins (not shown).

The inside of the chambers 34 and 36 is defined by upwardly extending walls 44 providing an internally reflective surface. The height of the walls 44 measured generally along the axis 18 is desirably no less than the width of the separation of the walls 44 perpendicular to that direction along a radius about axis 18 so as to pen-it internal reflections 46 within the chambers 34 and 36 serving to diffuse the light from the LEDs 42. A plastic suitable for molding the walls 44 of the chambers 34, 36 is PPO or polyphenylene oxide.

An upper edge of the chambers 34 and 36 is fitted with a diffuser 50 formed in the shape of a sector of a circle and being constructed, for example, from a translucent thermoplastic material to provide for diffusion 53 improving the uniformity of the illumination.

Figure 7:
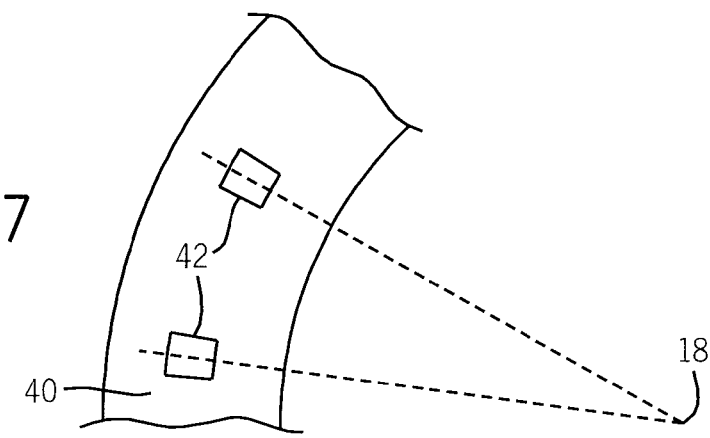
FIG. 7 is a fragmentary plan view of the LED board carrier showing orientation of the LEDs.

Referring now to FIG. 7 the dies of the LEDs 42 may be mounted on the LED carrier card 40 so that their axes are rotated to provide a constant orientation with respect to the axis 18 so that any unevenness in illumination is really symmetric. The dies of the LEDs 42 are otherwise positioned in separation to promote uniformity of illumination of the diffuser 50 to produce an effect of a solid evenly illuminated sector.

Figure 4:
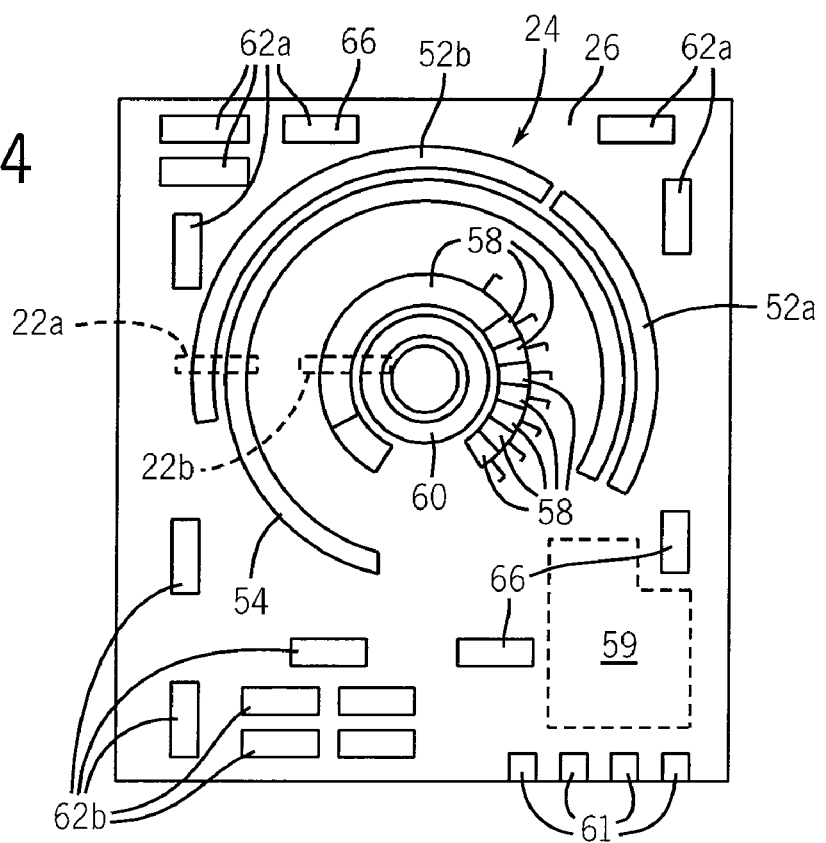
FIG. 4 is a bottom plan view of the circuit board of FIG. 3 showing conductive traces that form part of an LED switching circuit and that form an electrical encoder, and showing a distribution of discrete resistors for operation on line voltage.

Referring now to FIG. 4, contacts 24 on the bottom surface of the printed circuit board may provide a set of concentric circular traces, including outermost traces 52a and 52b at a first radius and corresponding in angular extent generally to the angular extent of chambers 36 and 34 respectively. Adjacent ends of outermost traces 52a and 52b are electrically separate on the printed circuit board 26. Continuously within these outermost traces 52a and 52b is trace 54 which may be selectively joined to one of trace 52a and 52b by a first wiper finger 22a.

Within traces 52 and 54 are a set of electrically independent traces 58 lying along a common radius, each trace 58 connected to a different point on a resistor ladder 59 to have a different electrical voltage. One of these traces 58 may be joined to an internal circular trace 60 by means of second wiper fingers 22b so as to provide for an encoder or potentiometer indicating angular position of the shaft 16 by the voltage communicated to internal circular trace 60. The internal circular trace 60 may join with a conductive finger 61 at the edge of the printed circuit board 26 to provide an output signal to remote circuitry requiring knowledge of the operator position. Other conductive fingers 61 may receive line voltage and ground to provide power to the dial control 10 as will be described.

A plurality of high wattage resistors 62a and 62b may be distributed over the bottom of the printed circuit board 26 with the resistors 62a connected in series and resistors 62b connected in series. The bottom of the board may also support rectifiers 66 as will be described.

Figure 5A:
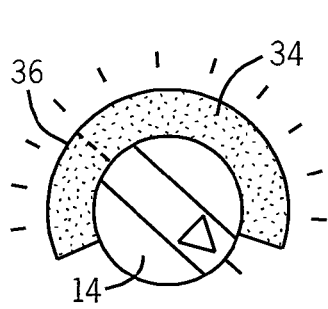
FIGS. 5a-5c are views of the control of the present invention from a user's point of view showing sequence of the illuminated sectors during use.
Figure 5B:
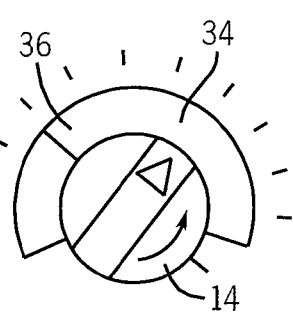
Figure 5C:
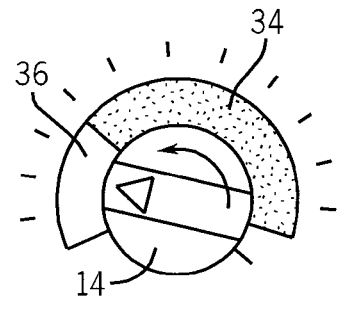

Referring now to FIG. 5a-5c, chambers 34 and 36 may partially surround the knob 14 as described, and when the knob is positioned in the "off" position corresponding to no gas flow (as shown) the diffuser 50 of chambers 34 and 36 will be dark.

Referring to FIG. 5b with counterclockwise rotation of the knob 14, the gas valve is turned on full to aid in ignition of the burner and both chambers 36 and 34 are fully illuminated commensurate with the high flame level that would be expected.

As shown in FIG. 5c, continued counterclockwise rotation of the knob 14 may move the gas valve to a simmer range in which only chamber 36 is illuminated, the illumination of chamber 36 continuing at all times when gases flowing.

Figure 6:
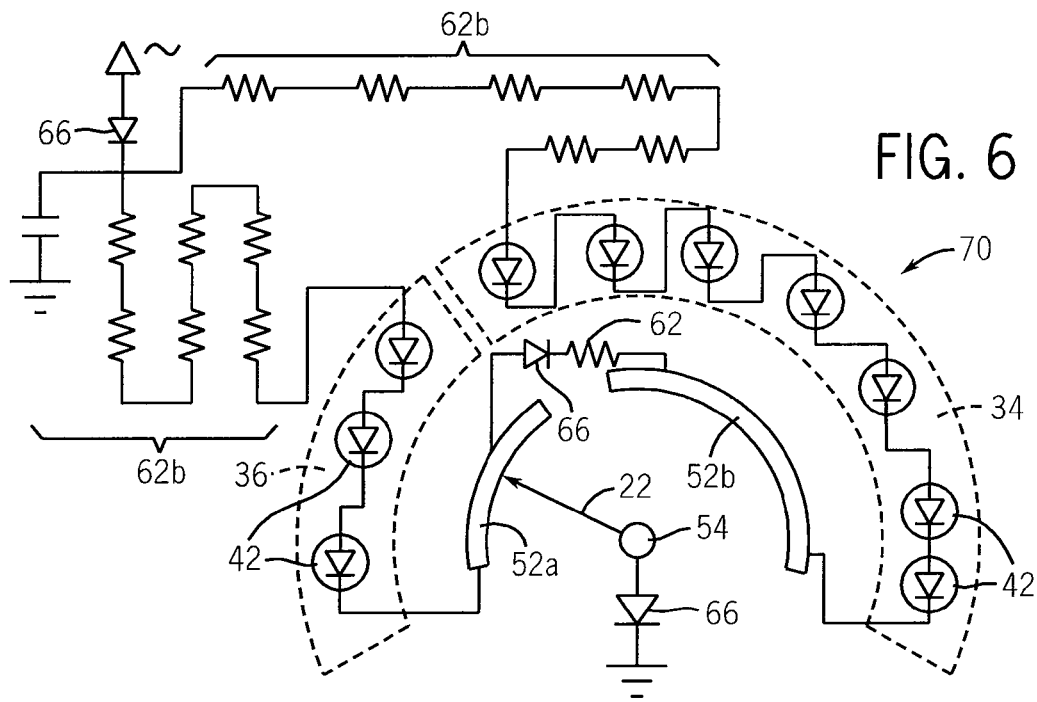
FIG. 6 is an electrical schematic of the switching circuitry used in the present invention.

Referring now to FIG. 6, the switching sequence described above with respect to FIGS. 5a-5c is provided by switching circuitry 70 which connects seven LEDs 42 of chamber 34 in series and three LEDs 42 of chamber 36 in series to maximize the voltage drop that will occur across the LEDs 42 reducing the voltage drop across resistors 62. The cathode end of the series connected LEDs 42 of chamber 36 is connected to trace 52a which, as shown, may be connected to ground through a rectifier 66 when wipers 22 bridge trace 52a and 54 with the knob 14 being in the position shown in FIG. 5c.

The anode end of the series connected to LEDs 42 of chamber 36 is connected to the series connected resistors 62b, which in turn connect at their other end to a second rectifier 66 receiving line power. Thus half-wave rectified voltage having a root mean square value of approximately 54 volts is applied to the series connected resistors 62b and LEDs 42 to provide a desired level of illumination of chamber 36.

The cathode end of series connected LEDs 42 of chamber 34 is connected to trace 52b which may also be connected to trace 54 through wiper 22 by rotation of the knob 14 to the position shown in FIG. 5b. The anode end of the series connected LEDs 42 of chamber 34 is connected to one end of the series connected resistors 62b, the other end of which connects to line power through rectifier 66. When trace 52b is grounded through wiper 22 and rectifier 66, LEDs 42 of chamber 34 may be illuminated. In addition, a rectifier 66 and series resistor joins trace 52a to 52b to allow current flow from 52a to 52b so that when the wiper 22 connects trace 52b to trace 54 current may flow also through the LEDs 42 of chamber 36. The resistor 62 in this series connected diode bridge between traces 52a and 52b may be used to permit slightly brighter illumination of chamber 36 when it is illuminated individually and thus to warn of low flame while allowing perfect matching of the illumination of chambers 36 and 34 when both are illuminated.

Each of the resistors 62 may for example be 1 W resistors spread about the printed circuit board 26 to prevent concentration of heat and thus excessive temperature rise, in this way permitting a simple reduction of line voltage. The use of two redundant half-wave rectifiers 66 reduces the risk of overvoltage caused by rectifier failure.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An illuminated dial control comprising:
a dial operator rotating about an axis;
switch circuitry communicating with the dial operator to produce switched electrical signals with rotation of the dial operator;
arcuate internally reflective chambers positioned concentrically about the axis and around the dial operator;
light diffusers positioned on front surfaces of the reflective chambers together with the reflective chambers to define sectors of a ring about the axis;
light-emitting diodes positioned at a back surface of the reflective chambers and receiving the switched electrical signals to evenly illuminate different sectors of the ring with rotation of the dial operator; and
a printed circuit board supporting the light diffusers and light emitting diodes on a first surface surrounding the axis and having a hole allowing an operator shaft to pass through the printed circuit board to communicate with a wiper configured to rotate with the dial operator such that the wiper interengages with a contact set on a second surface of the printed circuit board opposite the first surface forming a portion of the switch circuitry, wherein the contact set includes a set of concentric traces having outermost traces at a first radius and corresponding in angular extent generally to the arcuate extent of the chambers with adjacent ends of the outermost traces being electrically separate on the printed circuit board, and an inner trace positioned continuously within the outermost traces such that the inner trace can be selectively joined to one of the outermost traces by the wiper.

2. The illuminated dial control of claim 1 further including a gas valve operated by the dial operator to control a gas burner.

3. The illuminated dial control of claim 2 further wherein the switch circuitry illuminates at least one sector at all times when the burner is on.

4. The illuminated dial control of claim 3 further including a rotary encoder communicating with the operator.

5. The illuminated dial control of claim 1 wherein the arcuate internally reflective chambers have a height measured from front surfaces to back surface substantially no less than a width of the arcuate internally reflective chambers measured along a radius of the arcuate internally reflective chambers.

6. The illuminated dial control of claim 1 wherein the light emitting diodes are blue.

7. The illuminated dial control of claim 1 further including:
at least one rectifier receiving line voltage;
a resistance element communicating with the rectifier to provide a reduced voltage switched by the switch circuitry to provide the switched electrical signals to the light emitting diodes.

8. The illuminated dial control of claim 7 including two rectifiers electrically in series and separated by a resistance of the resistance element.

9. The illuminated dial control of claim 1 wherein the printed circuit board further includes:
at least one rectifier diode receiving a line voltage; and
wherein the switch circuitry further includes at least one set of series connected discrete resistors communicating with the rectifier diode and providing a reduced voltage connectable directly to light emitting diodes by the switch circuitry.

10. The illuminated dial control of claim 9 wherein at least one set of series connected resistors and at least one diode are arrayed on a second surface of the printed circuit board.

11. The illuminated dial control of claim 9 wherein the printed circuit board further includes a secondary contact set interengaging with the wiper to provide a signal independently indicating operator position.

12. The illuminated dial control of claim 1 wherein the light emitting diodes are arranged at positions along an arc of constant radius with their axes rotated corresponding to a position along the arc.

13. The illuminated dial control of claim 1 wherein the light emitting diodes for each sector are in series.

* * * * *